April 24, 1945.  C. M. TERRY  2,374,568

AUTOMATIC VALVE MECHANISMS

Filed Nov. 11, 1942

Inventor
CHARLES M. TERRY
By Albert G. Blodgett
Attorney

Patented Apr. 24, 1945

2,374,568

UNITED STATES PATENT OFFICE 2,374,568

AUTOMATIC VALVE MECHANISM

Charles M. Terry, Decatur, Ill., assignor to A. W. Cash Company, Decatur, Ill., a corporation of Delaware Application November 11, 1942, Serial No. 465,243

8 Claims. (Cl. 137—153)

This invention relates to automatic valve mechanisms, and more particularly to the construction and arrangement of a valve which will operate to maintain a substantially constant drop in the pressure of the fluid traveling therethrough.

In certain installations of oil cooling equipment there is need for an automatic valve for use in a by-pass line. The viscosity of oil varies greatly with its temperature, and if an oil cooler is designed for a normal pressure drop of say eleven pounds, it will be found that when starting up with the oil cold the pressure drop may run as high as perhaps forty or fifty pounds. This high pressure drop may be avoided by allowing a considerable portion of the oil to by-pass the cooler through a suitable valve, which should preferably open automatically to the required extent.

It is accordingly one object of the invention to provide an automatic valve mechanism of simple, inexpensive and dependable construction which will restrict the flow of fluid in such a manner as to maintain a substantially constant drop in the fluid pressure.

It is a further object of the invention to provide an automatic valve mechanism arranged to respond to variations in a fluid pressure differential and so constructed as to operate steadily without surging or fluttering.

It is a further object of the invention to provide an automatic valve mechanism having a biasing spring, and means to control the operation manually in the event of spring breakage.

With these and other objects in view, as will be apparent to those skilled in the art, the invention resides in the combination of parts set forth in the specification and covered by the claims appended hereto.

Figure 1:
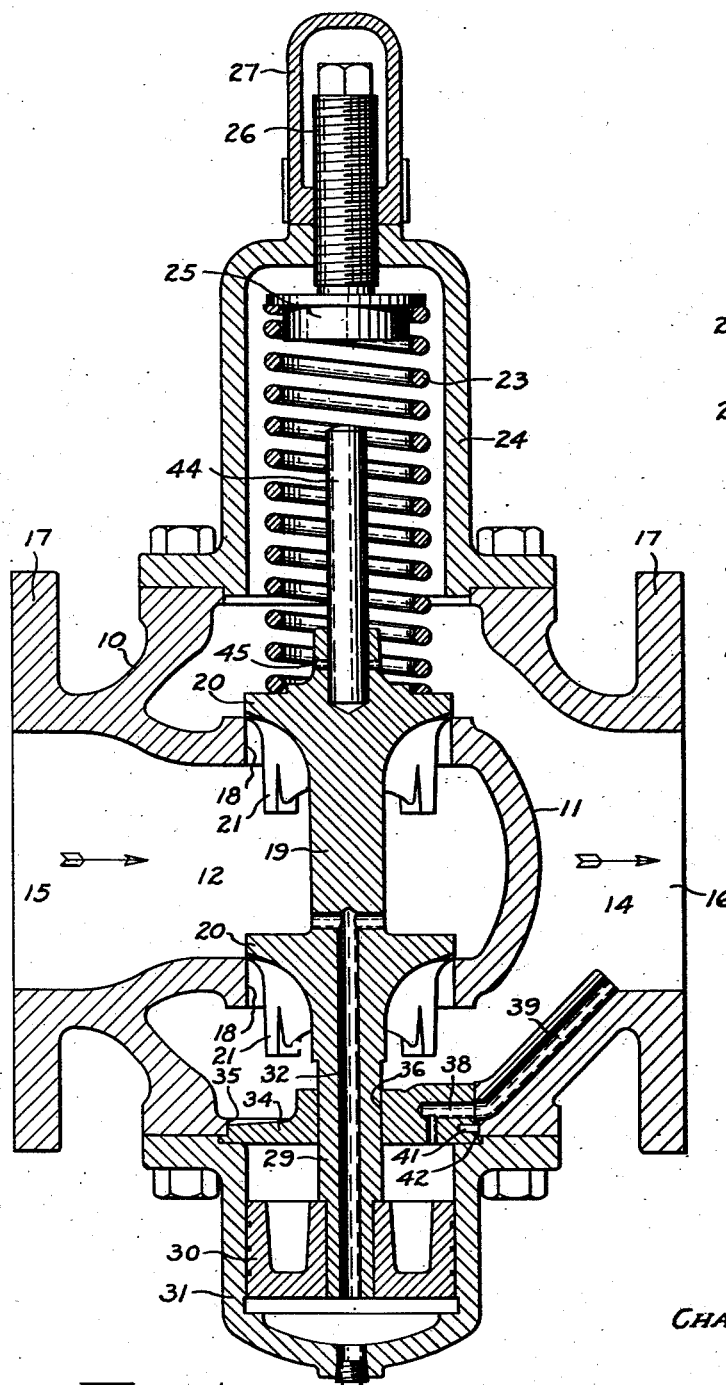
Figure 2:
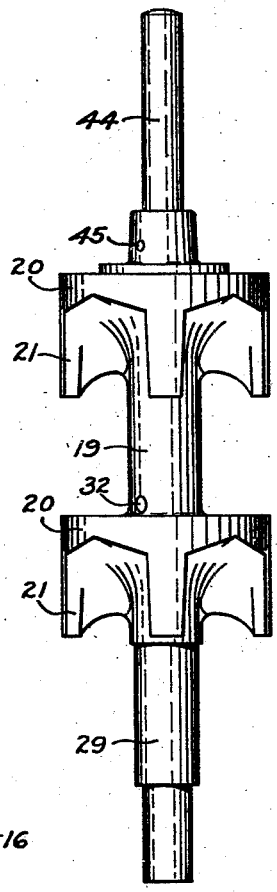

Referring to the drawing illustrating one embodiment of the invention, and in which like reference numerals indicate like parts, Fig. 1 is a longitudinal section through an automatic valve mechanism; and Fig. 2 is an elevation of a valve member forming a part of the mechanism.

The embodiment illustrated comprises a hollow body or casing 10 which is divided internally by a partition 11 to provide an inlet chamber 12 and an outlet chamber 14. The body 10 is provided on opposite sides with external openings 15 and 16 which communicate with the inlet and outlet chambers respectively, these openings being surrounded by flanges 17 so that the body may be readily connected to inlet and outlet pipes (not shown). The partition 11 is shaped as a horizontally positioned U, with the interior of the U forming a portion of the inlet chamber 12. Each of the two horizontal branches of the U is provided with a cylindrical port 18, the two ports being vertically aligned. Within these ports there is mounted a vertically slidable valve member 19 of the balanced type having two cylindrical portions or disks 20 to control the flow through the ports. Guide wings 21 depend from each disk 20 to engage the walls of the ports and maintain the valve member in proper alignment with the ports. Upward movement of the valve member opens the ports for increased flow of fluid.

The valve member 19 is biased downwardly toward its closed position. For this purpose a helical compression spring 23 is provided above the valve member, with the lower end of the spring engaging the top of the valve member. This spring is enclosed in a chamber 24 secured to the top of the body 10. The upper end of the spring engages a button 25 on the lower end of a vertical screw 26 which is threaded through the top of the chamber 24. A cap 27 is mounted on the upper portion of the screw to engage the top of the spring chamber and prevent any leakage of fluid.

The valve member 19 is urged upwardly against the force of the spring 23 by a device which is responsive to the difference between the fluid pressures in the inlet and outlet chambers. In the preferred construction illustrated, the valve member is provided with a depending cylindrical stem 29 with its lower portion slightly reduced in diameter to receive a piston 30, this piston being slidable vertically in a cylinder 31 secured to the bottom of the body 10. The fluid pressure in the inlet chamber 12 is transmitted to the lower end of the cylinder 31, beneath the piston 30, through a continuously open passage 32 which extends vertically through the center of the stem 29, the upper end of the passage branching laterally into communication with the inlet chamber. The top of the piston 30 is subjected to the fluid pressure in the outlet chamber 14 at a point near the outlet opening 16. For this purpose the upper end of the cylinder 31 is closed by a plate 34 which is mounted in an opening 35 formed in the bottom of the body 10, this plate being held in place between the cylinder and the body. The plate 34 has a central bore 36 through which the valve stem 29 may slide, and an L-shaped passage 38 which connects the upper end of the cylinder with a passage 39 in the body 10. This passage 39 slopes upwardly toward the outlet 16 and into communication with the adjacent portion of the outlet chamber 14 at a point laterally removed from the lower port 18. In order to ensure proper registration of the passages 38 and 39, a small pin 41 is mounted in the periphery of the plate 34 and extends into a notch 42 in the wall of the opening 35.

While the possibility that the spring 23 might break is a remote one, it is desirable for the sake of the utmost reliability to provide for manual control of the valve in such an emergency. For this purpose the top of the valve member 19 is drilled to receive the lower end of a vertical rod or stem 44 which is secured in place by means of a transverse pin 45. In the event of spring breakage, the cap 27 may be removed and the screw 26 turned inwardly to bring the button 25 into contact with the upper end of the stem 44. In this manner the valve member 19 may be placed in any desired position to regulate the flow of the fluid.

The operation of the invention will now be apparent from the above disclosure. The inlet 15 will be connected to a supply of fluid under pressure, as, for example, the inlet of an oil cooling apparatus, and the outlet 16 will be connected to a supply of fluid at a lower pressure, such as the outlet of the oil cooling apparatus, so that the valve mechanism may serve as a by-pass for a portion of the oil whenever the pressure drop through the cooling apparatus exceeds a predetermined value. The pressure in the inlet chamber 12 will be effective on the bottom of the piston 30 through the passage 32, and the lower pressure in the outlet chamber 14 will be effective on the top of the piston through the passages 39 and 38. Thus the differential fluid pressure tends to raise the piston and the valve member 19 to open the valve, this tendency being opposed by the downward force of the spring 23. Consequently, so long as the pressure differential exceeds the value for which the spring has been adjusted, the valve member 19 will be in a balanced state with the disks 20 raised above the ports 18 to allow fluid to flow therethrough at the rate necessary to maintain the pressure drop substantially constant. If the pressure differential increases, the valve will be opened further to allow an increased flow of fluid and thus limit the increase, and if the pressure differential decreases, the valve will be moved toward its closed position to reduce the flow and limit the decrease. The plate 34 prevents the fluid which is discharged downwardly through the lower port 18 from impinging on the piston 30 and creating an excessive fluid pressure thereon. The apparatus has been tested both with and without the plate 34, and the range or change in pressure differential required to produce full travel of the valve member 19 is substantially doubled by removal of this plate. Furthermore, with the plate in position, the fluid can enter or leave the upper portion of the cylinder 31 only by way of the comparatively restricted passageway 38—39. Consequently the cylinder and piston serves as a dashpot which greatly stabilizes the valve action and prevents surging or fluttering of the valve member 19. If by any chance the spring 23 should break, the cap 27 can be removed and the screw 26 turned inwardly until the button 25 engages the upper end of the stem 44, thereby forcing the valve member downwardly to any desired position.

The mechanism is relatively simple and inexpensive to manufacture and thoroughly dependable in service.

In the claims, certain terms such as "upper," "lower," "vertical," "horizontal," and the like are employed. It should be noted however that the apparatus can be mounted in positions other than that illustrated, and such terms should not be considered as limitations except as they describe the relative positions of the various parts.

Having thus described my invention, what I claim as new and desire to secure by Letters Patent is:

1. Automatic valve mechanism comprising a hollow body, a partition dividing the interior of the body into an inlet chamber and an outlet chamber, the partition having a port therein for the flow of fluid from the inlet chamber to the outlet chamber, a vertically reciprocable valve member associated with the port to control the flow and closing in a downward direction, a spring above the valve member and urging the same downwardly, a cylinder located beneath the valve member and communicating at its upper end with the outlet chamber, a piston vertically reciprocable in the cylinder, the valve member having a stem extending downwardly and connected to the piston, and means providing a continuously-open passage connecting the inlet chamber with the lower end of the cylinder.

2. Automatic valve mechanism comprising a hollow body, a partition dividing the interior of the body into an inlet chamber and an outlet chamber, the partition having a port therein, a reciprocable valve member to control the flow of fluid through the port, a spring connected to the valve member to urge it toward its closed position, and a slidable piston connected to the valve member and subjected on one side to the fluid pressure in the outlet chamber, the valve member having a continuously-open passage therethrough to transmit the fluid pressure in the inlet chamber to the other side of the piston and urge the valve member in opposition to the spring.

3. Automatic valve mechanism comprising a hollow body, a partition dividing the interior of the body into an inlet chamber and an outlet chamber, the partition having a port therein for the flow of fluid from the inlet chamber to the outlet chamber, a vertically reciprocable valve member associated with the port to control the flow and closing in a downward direction, a spring above the valve member and urging the same downwardly, a cylinder beneath the valve member, a piston vertically reciprocable in the cylinder, the valve member having a stem extending downwardly and connected to the piston, the stem having a continuously-open passage therethrough connecting the inlet chamber with the lower end of the cylinder, and means providing a passage connecting the outlet chamber with the upper end of the cylinder.

4. Automatic valve mechanism comprising a hollow body, a partition dividing the interior of the body into an inlet chamber and an outlet chamber, the partition having a port therein for the flow of fluid from the inlet chamber to the outlet chamber, a vertically reciprocable valve member associated with the port to control the flow and closing in a downward direction, a spring above the valve member and urging the same downwardly, a cylinder beneath the valve member, a piston vertically reciprocable in the cylinder, a plate closing the upper end of the cylinder and provided with a bore, the valve member having a stem extending downwardly through the bore and connected to the piston, the stem having a continuously-open passage therethrough connecting the inlet chamber with the lower end of the cylinder, and means providing a passage connecting the outlet chamber with the upper end of the cylinder.

5. Automatic valve mechanism comprising a hollow body, a partition shaped as a horizontally positioned U dividing the interior of the body into an inlet chamber and an outlet chamber, the interior of the U forming a portion of the inlet chamber and each branch of the U having a port therein with the ports vertically aligned, a vertically reciprocable valve member having two disks thereon associated with the respective ports to control the flow therethrough and closing in a downward direction, a helical compression spring engaging the top of the valve member to urge the same downwardly, a vertical cylinder secured to the body beneath the valve member, a piston vertically reciprocable in the cylinder, a plate closing the upper end of the cylinder and provided with a bore, the valve member having a stem extending downwardly through the bore and connected to the piston, the stem having a continuously-open passage therethrough connecting the inlet chamber with the lower end of the cylinder, and means providing a passage connecting the outlet chamber with the upper end of the cylinder.

6. Automatic valve mechanism comprising a hollow body, a partition shaped as a horizontally positioned U dividing the interior of the body into an inlet chamber and an outlet chamber, the interior of the U forming a portion of the inlet chamber and each branch of the U having a port therein with the ports vertically aligned, a vertically reciprocable valve member having two disks thereon associated with the respective ports to control the flow therethrough and closing in a downward direction, a helical compression spring engaging the top of the valve member to urge the same downwardly, a vertical cylinder secured to the body beneath the valve member, a piston vertically reciprocable in the cylinder, a plate closing the upper end of the cylinder and provided with a bore, the plate being held in position between the cylinder and the body, the valve member having a stem extending downwardly through the bore and connected to the piston, the stem having a continuously-open passage therethrough connecting the inlet chamber with the lower end of the cylinder, and means providing a restricted passage connecting the upper end of the cylinder with the outlet chamber at a point laterally removed from the lower port.

7. Automatic valve mechanism comprising a hollow body, a partition dividing the interior of the body into an inlet chamber and an outlet chamber, the partition having a port therein for the flow of fluid from the inlet chamber to the outlet chamber, a vertically reciprocable valve member associated with the port to control the flow and closing in a downward direction, a fluid pressure responsive device connected to the lower end of the valve member to urge the same upwardly, means to subject the said device to the difference in the pressures in the inlet and outlet chambers, a helical compression spring engaging the upper end of the valve member to urge the same downwardly, a manually adjustable device engaging the upper end of the spring to support the same, and a stem projecting upwardly from the valve member in position to be engaged by the manually adjustable device, in the event of spring breakage, to allow manual control of the valve member.

8. Automatic valve mechanism comprising a hollow body, a partition dividing the interior of the body into an inlet chamber and an outlet chamber, the partition having a port therein for the flow of fluid from the inlet chamber to the outlet chamber, a vertically reciprocable valve member associated with the port to control the flow and closing in a downward direction, a vertical cylinder secured to the bottom of the body, a piston slidable in the cylinder and connected to the valve member to urge the same upwardly, means to subject the piston to the difference in the pressures in the inlet and outlet chambers, a spring chamber secured to the top of the body, a helical spring located within the spring chamber and engaging the upper end of the valve member to urge the same downwardly, a manually adjustable vertical screw mounted in the top of the spring chamber to support the upper end of the spring, and a stem projecting upwardly from the valve member and into the interior of the spring in position to be engaged by the screw, in the event of spring breakage, to allow manual control of the valve member.

CHARLES M. TERRY.